UNITED STATES PATENT OFFICE.

FRITZ BENDER, OF MÜHLHEIM, NEAR FRANKFORT-ON-THE-MAIN, GERMANY, ASSIGNOR TO A. LEONHARDT & CO., OF SAME PLACE.

BLUE DYE.

SPECIFICATION forming part of Letters Patent No. 494,838, dated April 4, 1893.

Application filed January 3, 1893. Serial No. 457,117. (Specimens.) Patented in Germany August 27, 1890, No. 62,367; in England August 28, 1890, No. 13,565, and November 18, 1890, No. 18,623; in France January 27, 1891, No. 211,035, and February 6, 1891, and in Belgium February 13, 1891, No. 93,751.

*To all whom it may concern:*

Be it known that I, FRITZ BENDER, a subject of the German Emperor, resident at Mühlheim, near Frankfort-on-the-Main, Germany, (assignor to the firm of A. LEONHARDT & CO, of said Mühlheim,) have invented new and useful Improvements in Coloring-Matter, of which the following is a specification, and for which patents have been granted as follows, viz: in Germany August 27, 1890, No. 62,367; in France January 27, 1891, No. 211,035, and additional patent thereto February 6, 1891; in England August 28, 1890, No. 13,565, and November 18, 1890, No. 18,623, and in Belgium February 13, 1891, No. 93,751.

Dimethylmetaamidocresol (prepared by diazotizing metaamidodimethyl orthotoluidine and decomposing the diazo-compound with water) when brought into reaction with salts of paranitroso-derivatives of aromatic amines, such as nitrosodimethylaniline or nitrosodiethylaniline, yields a very beautiful new basic coloring matter of a greenish blue shade. The same coloring matter can be produced by employing instead of the paranitroso derivatives, their corresponding products of reduction. In this case of course the blue dyestuff must be obtained by means of an oxidation.

Hereinafter I give an exact description of the manner in which this invention is to be carried into practice.

First method. The reaction between the nitroso derivatives and dimethylmetaamidocresol takes place by heating the two components in a suitable dissolving or distributing agent.

Example. Three kilograms of dimethylmetaamidocresol are heated with four kilograms of chlohydrate of nitrosodimethylaniline and twenty liters of spirit at the reflux cooler until the nitrosodimethylaniline has disappeared. After cooling down, salt water and chloride of zinc are added and the obtained precipitate is filtered and extracted with about fifty parts of boiling water. The solution thus obtained after cooling down is again filtered and the coloring matter is again precipitated with common salt and chloride of zinc. It can be further purified by a repeated dissolving and precipitating.

Instead of spirit, other dissolving or distributing agents such as methylic alcohol or acetic acid or glycerine can be employed, but I have not found much advantage in substituting them for spirit.

Second method. When the above mentioned nitroso derivatives are substituted by their products of production (paraamidodimethylaniline or paraamidodiethylaniline) a mixture of the two components, as above stated, is to be subjected to an oxidation in a suitable manner. As oxidizing agents bichromates or peroxide of manganese together with acetic acid or ferric chloride can be employed, the latter giving the best results. The oxidation can also be effected by means of amidoazocompounds; in this case azo dyestuffs which by reduction yield paraamidodimethylaniline (such as benzeneazodimethylaniline) are melted with dimethylmetaamidocresol preferably in presence of a suitable diluting agent such as glycerine or phenol. It is probable that during this reaction the azodyestuffs are split and the paradiamine thus formed is condensed with dimethylmetaamidocresol yielding the blue dyestuff.

Example 1. Three kilograms of dimethylmetaamidocresol, 2.6 kilograms of paraamidodimethylaniline (or a corresponding quantity of a salt of this base) and ten kilograms of acetate of sodium are dissolved in one hundred and fifty liters of water and thirty liters of acetic acid of fifty per cent. To the boiling liquid are gradually added seventy liters of a solution of sesquichloride of iron of fifteen per cent. After boiling for some time the liquid is filtered and cooled down, then filtered again and the coloring matter is precipitated from the filtered liquid by means of common salt and chloride of zinc. It can be purified by dissolving and precipitating again.

Example 2. A mixture of five kilograms benzeneazodimethylaniline, four kilograms of dimethylmetaamidocresol, four liters of hydrochloric acid of thirty per cent. and twenty kilograms of glycerine are gradually heated up to 140–160° centigrade. At this temperature the melt gradually assumes an intensely blue tint. It is kept for, say, one hour at this temperature and then extracted with about five hundred liters of boiling water. To the boiling solution are gradually added about fifteen kilograms of acetate of sodium until the solution shows a pure blue color. It is then filtered and the coloring matter is precipitated in the usual manner.

The thus obtained new coloring matter dissolves in concentrated sulphuric acid giving a dark red solution which when diluted with water turns from red to blue. It is soluble in water or spirit with a bright greenish blue color. The diluted watery solution is not altered by carbonate of soda; by the addition of caustic soda lye a dark precipitate separates which dissolves in ether with a red fluorescence.

What I claim as my invention, and desire to secure by Letters Patent, is—

The new greenish blue coloring matter herein described derived from dimethyl meta-amido cresol and derivatives of aromatic amines, which dissolves in concentrated sulphuric acid giving a dark red solution turning from red to blue when diluted with water and which is also soluble in water or spirit with a bright greenish blue color, the diluted watery solution not being altered by carbonate of soda but by the addition of caustic soda lye giving a dark precipitate which dissolves in ether with a red fluorescence.

In testimony whereof I have signed my name to this specification in the presence of two subscribing witnesses.

FRITZ BENDER.

Witnesses:
FRANZ WIRTH,
FRANZ HASSLACHER.